US008009880B2

(12) United States Patent
Zhang et al.

(10) Patent No.: US 8,009,880 B2
(45) Date of Patent: Aug. 30, 2011

(54) RECOVERING PARAMETERS FROM A SUB-OPTIMAL IMAGE

(75) Inventors: Zhengyou Zhang, Bellevue, WA (US); Zicheng Liu, Bellevue, WA (US); Gang Hua, Redmond, WA (US); Yang Wang, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 11/747,695

(22) Filed: May 11, 2007

(65) Prior Publication Data

US 2008/0279423 A1 Nov. 13, 2008

(51) Int. Cl.
G06K 9/00 (2006.01)
G06K 9/56 (2006.01)
G09G 5/00 (2006.01)

(52) U.S. Cl. ........ 382/118; 382/308; 345/582; 345/583; 345/584; 345/585; 345/586

(58) Field of Classification Search .................. None
See application file for complete search history.

(56) References Cited

U.S. PATENT DOCUMENTS

| | | |
|---|---|---|
| 6,828,972 B2 | 12/2004 | Zhang et al. |
| 6,853,745 B1 | 2/2005 | Jacobs et al. |
| 6,888,960 B2 | 5/2005 | Penev et al. |
| 6,903,738 B2 | 6/2005 | Pfister et al. |
| 6,915,022 B2 | 7/2005 | Huang |
| 7,058,217 B2 | 6/2006 | Thornber et al. |
| 7,103,225 B2 | 9/2006 | Yang et al. |
| 7,139,439 B2 | 11/2006 | Hwang |
| 2006/0182367 A1 | 8/2006 | Moghaddam |

OTHER PUBLICATIONS

Marschner, S. R., B. Guenter, S. Raghupathy, Modeling and Rendering for Realistic Facial Animation, Rendering Techniques, 2000, pp. 231-242, Springer Wien New York.*

Zhang, L., S. Wang, D. Samaras, Face Sythesis and Recognition from a Single Image under Arbitrary Unknown Lighting Using a Spherical Harmonic Basis Morphable Model, Proc. of the 2005 IEEE comp. Soc. Conf. on Comp. Vision and Pattern recognition (CVPR'05), 2005, pp. 209-216, vol. 2.*

Adini, Y., Y. Moses, and S. Ullman, Face recognition, The problem of compensating for changes in illumination direction, PAMI, 1997, pp. 721-732, vol. 19.

Basri, R., and D. W. Jacobs, Lambertian reflectance and linear subspaces, IEEE Trans. Pattern Analysis and Machine Intelligence, Feb. 2003, pp. 218-233, vol. 25, No. 2.

(Continued)

*Primary Examiner* — Samir A Ahmed
*Assistant Examiner* — Fred Hu
(74) *Attorney, Agent, or Firm* — Lyon & Harr, L.L.P.; Craig S. Fischer (57) ABSTRACT

A subregion-based image parameter recovery system and method for recovering image parameters from a single image containing a face taken under sub-optimal illumination conditions. The recovered image parameters (including albedo, illumination, and face geometry) can be used to generate face images under a new lighting environment. The method includes dividing the face in the image into numerous smaller regions, generating an albedo morphable model for each region, and using a Markov Random Fields (MRF)-based framework to model the spatial dependence between neighboring regions. Different types of regions are defined, including saturated, shadow, regular, and occluded regions. Each pixel in the image is classified and assigned to a region based on intensity, and then weighted based on its classification. The method decouples the texture from the geometry and illumination models, and then generates an objective function that is iteratively solved using an energy minimization technique to recover the image parameters.

20 Claims, 7 Drawing Sheets

OTHER PUBLICATIONS

Belhumeur, P. N., J. P. Hespanha, D. J. Kriegman, Eigenfaces vs. fisherfaces: Recognition using class specific linear projection, Trans. on Pattern Analysis and Mach. Intelligence, Jul. 1997, pp. 711-720, vol. 19, No. 7.

Belhumeur, P., D. Kriegman, What is the set of images of an object under all possible illumination conditions?, Int. Journal of Comp. Vision, vol. 28, No. 3, 1998, pp. 245-260.

Blanz, V., S. Romdhani, T. Vetter, Face identification across different poses and illuminations with a 3D morphable model, Proc. Fifth IEEE Int'l Conf. on Automatic Face and Gesture Recognition, May 20-21, 2002, pp. 192-197.

Blanz, V., K. Scherbaum, T. Vetter, H.-P. Seidel, Exchanging faces in images, Proc. Eurographics'04, Computer Graphics Forum, pp. 669-676, vol. 23, No. 3.

Blanz, V., T. Vetter, A morphable model for the synthesis of 3D faces, Proceedings of the 26th Annual Conf. on Comp. Graphics and Interactive Techniques, 1999, pp. 187-194.

Cabral, B., M. Olano, and P. Nemec, Reflection space image based rendering, Proc. of the 26th Annual Conf. on Comp. Graphics and Interactive Techniques, 1999, pp. 613-620.

Chellappa, R., C. L. Wilson, S. Sirohey, Human and machine recognition of faces: A survey, Proc. of the IEEE, May 1995, pp. 705-741, vol. 83, No. 5.

Cootes, T., G. Edwards, and C. Taylor, Active appearance models, IEEE Trans. Pattern Analysis and Mach. Intelligence, 2001, pp. 681-685, vol. 23, No. 6.

Debevec, P.E., T. Hawkins, C. Tchow, H.-P. Duiker, W. Sarokin, and M. Sagar, Acquiring the reflectance field of a human face, Comp. Graphics, Annual Conf. Series Siggraph, Jul. 2000, pp. 145-156.

Dimitrijevic, M., S. Ilic, P. Fua, Accurate face models from uncalibrated and ill-lit video sequences, IEEE Comp. Soc. Conf. on Comp. Vision and Pattern Recognition (CVPR'04), 2004, pp. 1034-1041, vol. 2.

Eisemann, E., F. Durand, Flash photography enhancement via intrinsic relighting, Int'l Conf. on Comp. Graphics and Interactive Techniques, ACM SIGGRAPH 2004, pp. 673-678.

Epstein, R., P. Hallinan, and A. L. Yuille, 5±2 eigenimages suffice: an empirical investigation of low-dimensional lighting models, Proceedings of the Workshop on Physics-Based Modeling in Comp. Vision, Jun. 18-19, 1995, pp. 108-116.

Freeman, W. T., and E.C. Pasztor, Learning low-level vision, Int'l Conf. on Comp. Vision, 1999, pp. 1182-1189.

Georghiades, A. S., P. N. Belhumeur, and D. J. Kriegman, From few to many: Illumination cone models for face recognition under variable lighting and pose, Transactions on Pattern Analysis and Mach. Intelligence, Jun. 2001, pp. 643-660, vol. 23, No. 6.

Hallinan, P., A low-dimensional representation of human faces for arbitrary lighting conditions, Proc. IEEE CVPR, 1994, pp. 995-999.

Land, E. H. and J. J. McCann, Lightness and retinex theory, J. of the Optical Society of America, 1971, pp. 1-11, vol. 61, No. 1.

Lee, J., R. Machiraju, H. Pfister, B. Moghaddam, Estimation of 3D faces and illumination from single photographs using a bilinear illumination model, Eurographics Symposium on Rendering (EGSR), Jun. 2005.

Lee, J., B. Moghaddam, H. Pfister, R. Machiraju, A bilinear illumination model for robust face recognition, Tenth IEEE Int'l Conf. on Comp. Vision, Oct. 17-21, 2005, pp. 1177-1184, vol. 2.

Lee, K.-C., J. Ho, D. Kriegman, Nine points of light: Acquiring subspaces for face recognition under variable lighting, Proceedings of the 2001 IEEE Comp. Soc. Conf. on Comp. Vision and Pattern Recognition, 2001, pp. 519-526, vol. 1.

Liu, Z., Y. Shan, Z. Zhang, Expressive expression mapping with ratio images, SIGGRAPH 2001, Los Angeles, Aug. 12-17, pp. 271-276.

Loscos, C., G. Drettakis, and L. Robert, Interactive virtual relighting of real scenes, IEEE Trans. Visualization and Comp. Graphics, Dec. 2000, pp. 289-305, vol. 6, No. 4.

Luong, Q.-T., P. Fua, Y. G. Leclerc, Recovery of reflectances and varying illuminants from multiple views, 7th European Conference on Computer Vision, 2002, pp. 163-179, vol. 3.

Marschner, S. R., B. Guenter, and S. Raghupathy, Modeling and rendering for realistic facial animation, Rendering Techniques, 2000, pp. 231-242, Springer Wien New York.

Marschner S., S. Westin, E. Lafortune, and K. Torrance, Image-based BRDF measurement, Applied Optics, 2000, pp. 2592-2600, vol. 39, No. 16.

Qing, L., S. Shan, X. Chen, Face relighting for face recognition under generic illumination, IEEE Int'l Conf. on Acoustics, Speech, and Signal Processing (ICASSP2004), May 17-21, 2004, pp. 733-736, Quebec, Canada.

Ramamoorthi, R., and P. Hanrahan, An efficient representation for irradiance environment maps, Proceedings of ACM SIGGRAPH 2001, pp. 497-500.

Ramamoorthi, R. and P. Hanrahan, A signal-processing framework for inverse rendering, SIGGRAPH, 2001, pp. 117-128.

Riklin-Raviv, T., A. Shahua, The quotient image: Class based re-rendering and recognition with varying illuminations, IEEE Trans. on Pattern Analysis and Mach. Intelligence (PAMI) 2001, pp. 129-139, vol. 23, No. 2.

Romdhani, S., T. Vetter, Efficient, Robust and Accurate Fitting of a 3D Morphable Model, Proc. of the Ninth IEEE Int'l Conf. on Comp. Vision, 2003, vol. 2, pp. 59-66.

Salt, E., and S. Ullman, Recognizing novel 3D objects under new illumination and viewing position using a small number of examples, Proc. Int'l Conf. Comp. Vision, 1998, pp. 153-161.

Samaras, D., D. Metaxas, P. Fua, and Y. G. Leclerc, Variable albedo surface reconstruction from stereo and shape from shading, CVPR, 2000, pp. 480-487.

Sato, I., Y. Sato, and K. Ikeuchi, Acquiring a radiance distribution to superimpose virtual objects onto a real scene, IEEE Trans. on Visualization and Comp. Graphics, 1999, pp. 1-12, vol. 5, No. 1.

Sim, T., S. Baker, and M. Bsat, The CMU pose, illumination, and expression database, IEEE Trans. Pattern Analysis and Mach. Intelligence, Dec. 2003, pp. 1615-1618, vol. 25, No. 12.

Sim, T., and T. Kanade, Combining models and exemplars for face recognition: An illuminating example, Workshop on Models versus Exemplars in Computer Vision, Computer Vision Pattern Recognition Conference, 2001.

Stoschek, A., Image-based re-rendering of faces for continuous pose and illumination directions, Conf. on Comp. Vision and Pattern Recognition, 2000, pp. 1582-1587.

Tsalakanidou, F., S. Malassiotis, M. G. Strintzis, a 2D+3D face authentication system robust under pose and illumination variations, Proceedings of the 4th Int'l Symposium on Image and Signal Processing and Analysis, Sep. 15-17, 2005, pp. 203-208.

Tsalakanidou, F., F. Forster, S. Malassiotis, M. G. Strintzis, Real-time acquisition of depth and color images using structured light and its application to 3D face recognition, Real-Time Imaging, Oct.-Dec. 2005, pp. 358-369, vol. 11, No. 5-6.

Turk, M. and A. Pentland, Eigenfaces for recognition, J. of Cognitive Neuroscience, Mar. 1991, pp. 71-86.

Unger, J., A. Wenger, T. Hawkins, A. Gardner, P. Debevec, Capturing and rendering with incident light fields, Proceedings of the 14th Eurographics workshop on Rendering ACM Int'l Conf. Proceeding Series, 2003, vol. 44, pp. 141-149, Leuven, Belgium.

Wen, Z., Z. Liu, and T. Huang, Face relighting with radiance environment maps, Proc. of IEEE Conf. on Comp. Vision and Pattern Recognition, 2003, pp. 158-165.

Yan, S., M. Li, H. Zhang, Q. Cheng, Ranking prior likelihood distributions for Bayesian shape localization framework, Proc. of the Ninth IEEE Int'l Conf. on Comp. Vision, 2003, pp. 51, vol. 2.

Zhang, L., and D. Samaras, Face recognition under variable lighting using harmonic image exemplars, Proc. Comp. Vision & Pattern Recognition, 2003, pp. 19-25.

Zhang, L., S. Wang, D. Samaras, Face synthesis and recognition from a single image under arbitrary unknown lighting using a spherical harmonic basis morphable model, Proc. of the 2005 IEEE Comp. Soc. Conf. on Comp. Vision and Pattern Recognition (CVPR'05), 2005, pp. 209-216, vol. 2.

Zhao, W., R. Chellappa, P. Phillips, A. Rosenfeld, Face recognition: A literature survey, ACM Computing Surveys, 2003, pp. 399-458, vol. 35.

Zhao, W. Y., R. Chellappa, Illumination-insensitive face recognition using symmetric shape-from-shading, Proceedings, IEEE Conf. on Comp. Vision and Pattern Recognition, 2000.

Zhu, S. C., C.-E. Gou, Y. Wang, Z. Xu, What are Textons?, Int'l J. of Comp. Vision, 2005, pp. 121-143, vol. 62, No. 1-2.

* cited by examiner

RECOVERING PARAMETERS FROM A SUB-OPTIMAL IMAGE

BACKGROUND

Realism in computer-generated images requires accurate input models. One way of obtaining high-quality data is through measurements of scene attributes from real photographs using inverse rendering. Inverse rendering is the estimation of reflectance and illumination properties from real photographs in order to synthesize realistic images. Inverse rendering makes it possible to synthesize the images under different lighting and viewing conditions than that of the original photograph.

Inverse rendering is an active research area having with wide applications in both computer vision and computer graphics. One typical application is to generate photo-realistic images of human faces under arbitrary lighting conditions. Despite the complexity and challenging nature of this type of problem, great progress has been made in generating photo-realistic images of objects including human faces and face recognition under different lighting conditions.

One area where inverse rending can be used is the face re-lighting problem. For example, face recognition seeks to recognize faces under a variety of lighting conditions. When comparing faces that were taken under two different lighting conditions face re-lighting must be performed. By way of example, assume that a first face image was taken at a regular uniform lighting conditions and a second face image was taken in lighting where one side of the face is dark and the other side of the face is bright. It is desired to compare the two faces to determine if they are the same person. The first step is to change the lighting conditions of the second image to normalize the lighting conditions so the two images can be compared. This is achieved by re-lighting the second image such that two images can be compared. This allows the face recognition application to recognizes faces under a variety of lighting conditions.

The face re-lighting problem, however, is particularly difficult when there is only a single image of the human face available and it was taken under a harsh or sub-optimal lighting condition. Lighting (or illumination) coefficients for an image are modeled using a spherical harmonic representation. It has been shown that a set of images of a convex Lambertian object obtained under a wide variety of lighting conditions can be approximated by a low-dimensional linear subspace. The problem, however, with this technique is that under harsh lighting conditions the approximation error can be large. Thus, this remains an unsolved problem for both graphics and vision applications such as face relighting and face recognition. Furthermore, this problem becomes even more challenging when there are cast shadows, saturated areas, and partial occlusions.

Some current techniques use a region-based approach. Since lighting in smaller image regions is more homogeneous than larger regions, an image containing a face is divided into smaller regions and a different set of face model parameters is used for each region. In this situation the overall estimation error is smaller than in a single holistic approximation. However, there are two main problems with this region-based approach. First, if the majority of the pixels in a region are problematic (such as the pixels are in cast shadows, saturated, or there are large lighting estimation errors), then the texture (or albedo) information in that region cannot be correctly recovered. The albedo is a material property and is basically the reflectance of the skin. It is sometimes called the reflection coefficient. The albedo is irrespective of the illumination, but is often intertwined with the illumination such that it cannot be easily decoupled. The second problem is that the estimated albedo may be inconsistent across regions.

Another current technique uses a three-dimensional (3D) spherical harmonic basis morphable model (SHBMM) by adding the spherical harmonic illumination representation into a morphable model method. This technique produces photo-realistic rendering results under regular lighting conditions, but obtains poor results in saturated face image areas. Furthermore, because the texture is not separated from the spherical harmonic bases in SHBMM, this technique cannot handle harsh lighting conditions due to the large approximation errors in the spherical harmonic representation.

Another approach uses an image subdivision technique whereby a face is subdivided along feature boundaries (such as eyes, nose, mouth, and so forth) to increase the expressiveness of the morphable models. This approach estimates morphable model parameters independently over each region and performs smoothing along region boundaries to avoid visual discontinuity. However, this approach can not be applied to images under harsh lighting conditions because such images have of the inconsistency of the estimated textures in different regions. Moreover, if most pixels in a region are in cast shadows or saturated areas, there often is not enough information to recover the texture within the region itself.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subregion-based image parameter recovery system and method includes a robust and efficient way to recover image parameters from a single image containing a face, even when the image was taken under sub-optimal illumination conditions. More specifically, the system and method use a novel Markov Random Fields (MRF)-based energy minimization framework to jointly recover image parameters, including the lighting, geometry (or shape), and texture (or albedo), from a single face image under arbitrary unknown illumination. The subregion-based image parameter recovery system and method is robust to harsh lighting conditions, partial occlusions, cast shadows, and saturated image regions.

The subregion-based image parameter recovery system and method decouples the texture from the geometry and illumination models and integrates them into an energy minimization problem based on the theory of Markov Random Fields. In order to avoid the problems of albedo information in a region that cannot be recovered and having the estimated albedo be inconsistent across regions, the subregion-based image parameter recovery system and method uses a subregion based frame-work that uses a Markov Random Field to model the statistical distribution and spatial coherence of face texture.

The subregion-based image parameter recovery system and method use two separate morphable models to model the albedo and geometry and spherical harmonic illumination representations to model the illumination. The system and method then decouple the texture from the geometry (including the surface normal) and illumination models. These decoupled parameters then are integrated into an energy minimization problem based on the theory of Markov Random Fields. The decoupling is achieved by modeling the texture, geometry, and illumination separately.

The system and method process a single image containing a face. The image is composed of at least three components, the albedo (or skin color), the face geometry, and the lighting (or illumination). This system and method seek to decompose these three components based on a single observation (the single face image). This decomposition is a decoupling of the three components such that the lighting or illumination property is separated from the albedo and geometry. For example, if a red light is shined on skin it will appear red, but it is desirable to separate the albedo from the lighting conditions. Once the albedo of the face is decoupled from the illumination, then different lighting colors and lighting conditions can be added to the image.

The subregion-based image parameter recovery method includes dividing the portion of the image containing the face into a number of smaller regions that are smaller that the original image. A number of different regions are defined, including saturated regions, shadow regions, regular regions, and occluded regions. Each pixel in the image is classified and assigned to a region based on the pixel's intensity value. In addition, each pixel is weighted based on its classification. The regions classified as regular regions are further divided into subregions. Next, a morphable model for the albedo is generated for each region, and the spatial dependence of the albedo morphable model coefficients are modeled using an MRF-based framework. A 3D morphable model is generated for the geometry. In some embodiments, the geometry 3D morphable model is valid over the entire image. In other embodiments, a plurality of geometry 3D morphable models are generated, one for each of the regions.

The method decouples the albedo from the geometry and illumination models to enable a spatially varying texture representation thus being able to handle challenging areas such as cast shadows and saturated regions, and being robust to harsh lighting conditions and partial occlusions as well. The method generates an objective function and iteratively solves the function using an energy minimization technique. Once this objection function is solved, the image parameters associated with the image are recovered. These parameters include the albedo, illumination, and geometry or shape of the face.

The subregion-based image parameter recovery system and method can input a single photograph of a human face and recover the lighting, shape, and albedo even under harsh lighting conditions and with partial occlusions. These recovered image parameters can be used to relight the single image and to generate face images under a new lighting environment that is different from the original input image. The recovered image parameters can also be used to normalize the illumination effects in face recognition under varying illumination conditions.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of the subregion-based image parameter recovery system and method, reference is made to the accompanying drawings, which form a part thereof, and in which is shown by way of illustration a specific example whereby the subregion-based image parameter recovery system and method may be practiced. It is to be understood that other embodiments may be utilized and structural changes may be made without departing from the scope of the claimed subject matter.

I. System and Operational Overview

Figure 1:
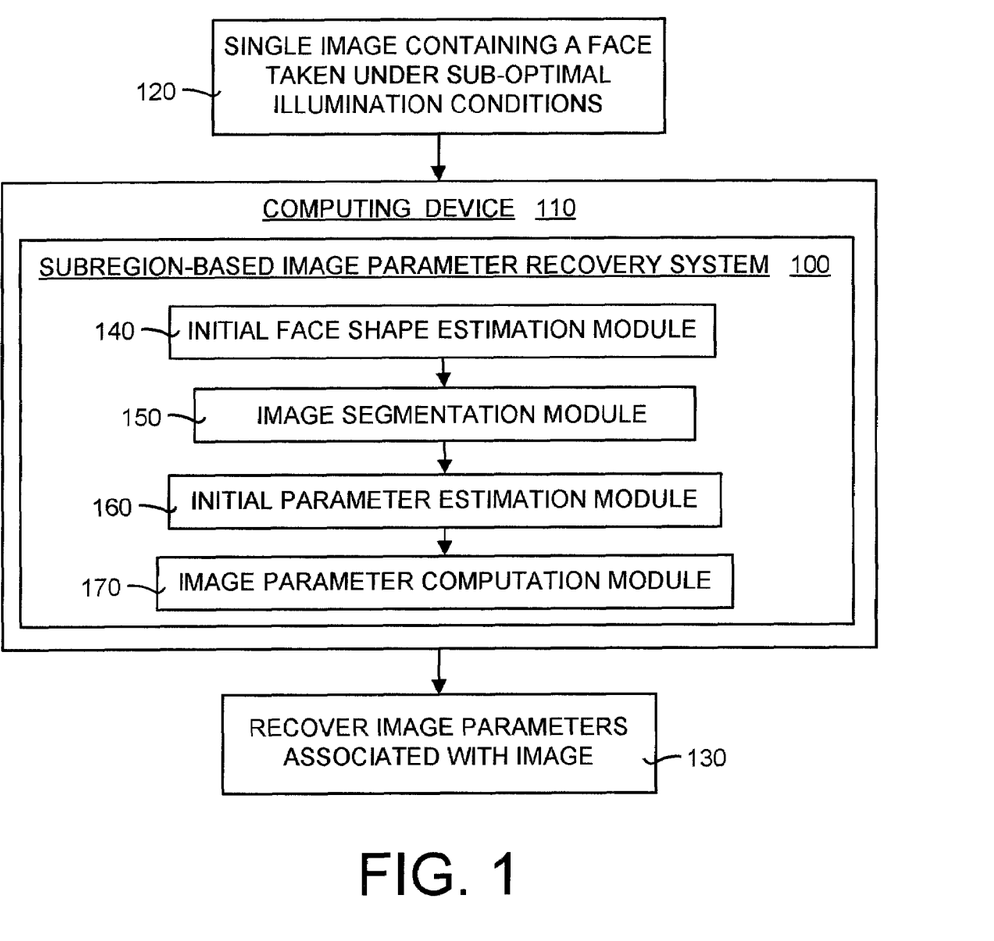
FIG. 1 is a block diagram illustrating an exemplary implementation of the subregion-based image parameter recovery system disclosed herein.

FIG. 1 is a block diagram illustrating an exemplary implementation of the subregion-based image parameter recovery system 100 disclosed herein. It should be noted that FIG. 1 is merely one of several ways in which the subregion-based image parameter recovery system 100 may be implemented and used. The subregion-based image parameter recovery system 100 may be implemented on various types of processing systems, such as on a central processing unit (CPU) or multi-core processing systems.

Referring to FIG. 1, the subregion-based image parameter recovery system 100 is shown implemented on a computing device 110 (such as a desktop or laptop computer). The input to the subregion-based image parameter recovery system 100 is a single image containing a face (box 120). The image was taken under sub-optimal illumination conditions, such as harsh lighting conditions. This single image is the only input to the subregion-based image parameter recovery system 100. As explained in detail below, the subregion-based image parameter recovery system 100 processes this single image, decouples the albedo and illumination parameters from each other, and recovers image parameters associated with the image (box 130). By way of example, these image parameters can be used to improve the illumination conditions of the single input image.

The subregion-based image parameter recovery system 100 includes software or program modules for execution on the computing device 110. In particular, the subregion-based image parameter recovery system 100 includes an initial face shape estimation module 140 and an image segmentation module 150. The initial face shape estimation module finds the face within the image and obtains an initial estimate of the shape of the face. The image segmentation module 150 takes the initial face shape estimate and segments it into different regions.

The subregion-based image parameter recovery system 100 also includes an initial parameter estimation module 160, and an image parameter computation module 170. The initial parameter estimation module computes initial estimates of the albedo and the illumination parameter. The image parameter computation module 170 uses an energy minimization technique to iteratively solve an objective function to recover the image parameters. The operation of each of these modules will be discussed in detail below.

Figure 2:
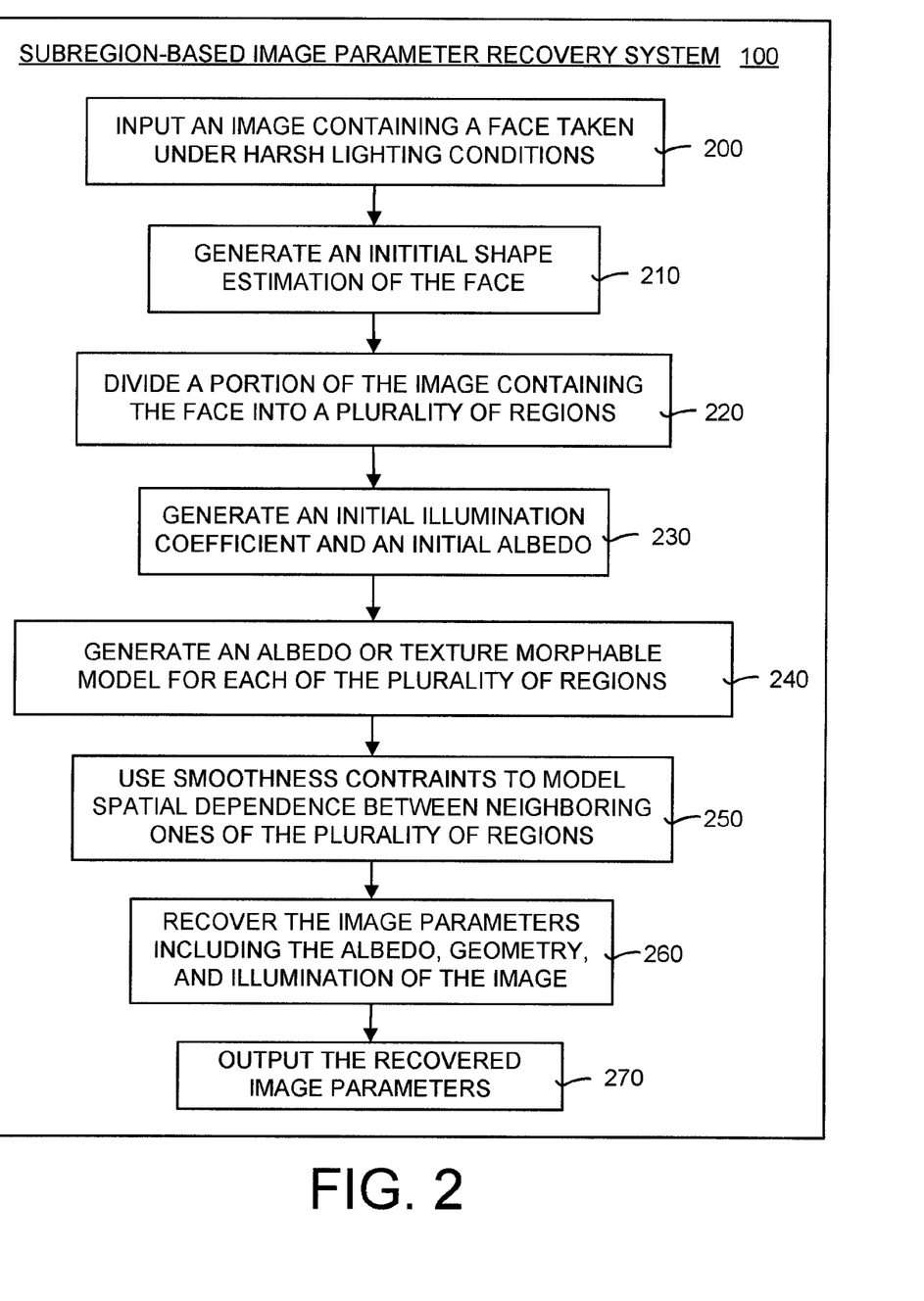
FIG. 2 is a flow diagram illustrating the general operation of the method used in the subregion-based image parameter recovery system shown in FIG. 1.

FIG. 2 is a flow diagram illustrating the general operation of the method used in the subregion-based image parameter recovery system 100 shown in FIG. 1. In general, the subregion-based image parameter recovery method takes a single image containing a face with sub-optimal illumination conditions and recovers image parameters by decoupling the parameters from each other. More specifically, the subregion-based image parameter recovery method begins by inputting an image containing a face taken under harsh lighting conditions (box 200). An initial estimate of the shape of the face then is generated (box 210). The portion of the image containing the face then is divided into a plurality of regions (box 220). Next, an initial illumination coefficient and an initial albedo are generated (box 230).

Figure 6:
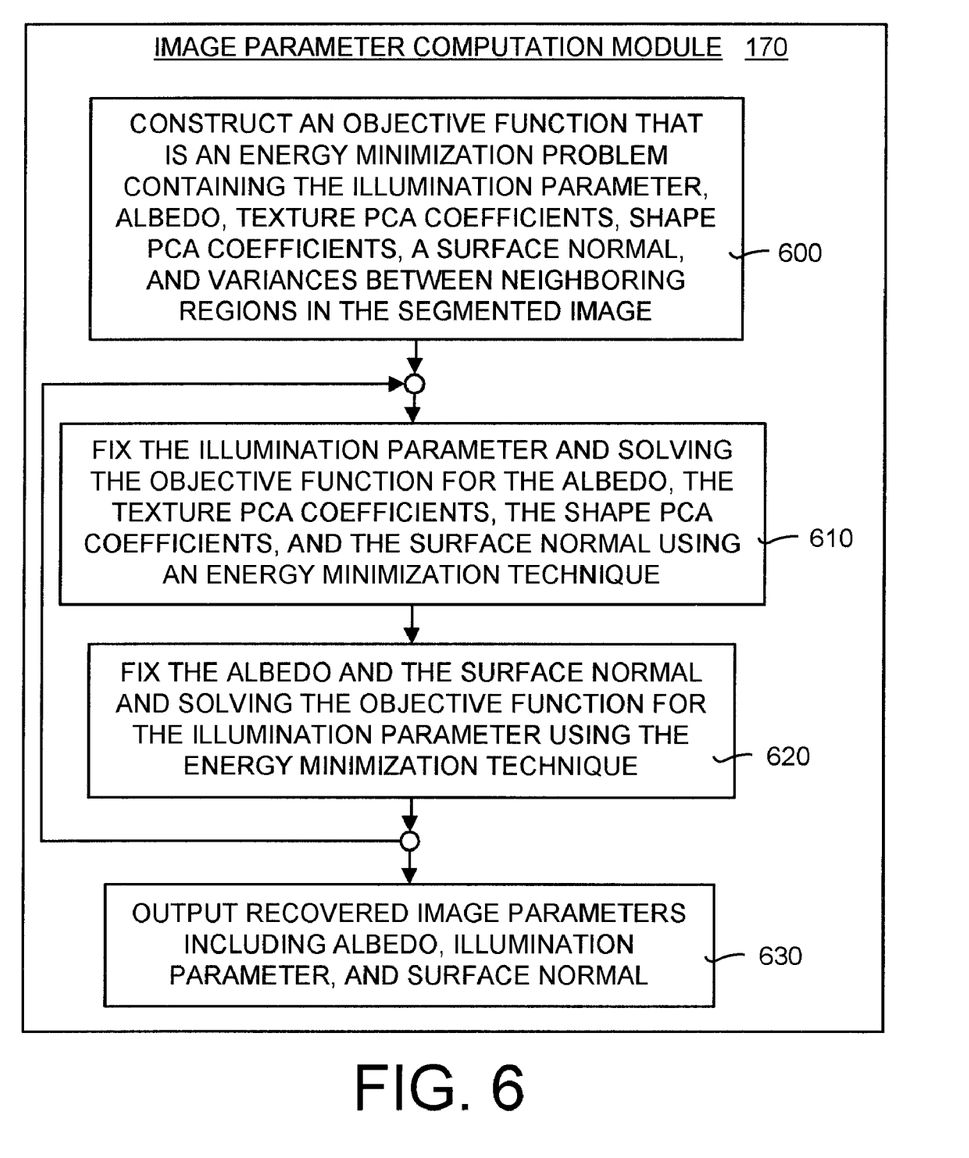
FIG. 6 is a flow diagram illustrating the detailed operation of the image parameter computation module shown in FIG. 1.

A texture (or albedo) morphable model (and accompanying coefficients) is generated for each of the plurality of regions (box 240). Smooth constraints are used to model spatial dependence between neighboring regions in the plurality of regions (box 250). Image parameters, including the albedo, geometry, and illumination then are recovered by iteratively solving an objective function (box 260). In particular, as shown in FIG. 6 and discussed below, the objective function is iteratively solved by holding illumination constant while solving for the albedo and geometry and then holding the albedo and geometry constant while solving for the illumination. Finally, the recovered image parameters are output (box 270).

II. Operational Details

Each of the modules discussed above will now be discussed in further detail. In addition, the accompanying mathematical details will be shown and discussed. In addition, along the way a 3D morphable model and spherical harmonic representation is discussed in order to provide a background and orientation for the subsequent discussion.

Face Morphable Models

Generally, a three-dimensional (3D) face morphable model defines a vector space of 3D shapes and colors (reflectances). In particular, both the shape S model and the texture T model of a new face can be generated by a convex combination of the shapes and texture of the m exemplar 3D faces. Mathematically, this can be written as, $$S_{model} = \overline{S} + \sum_{i=1}^{m-1} \alpha_i s_i; \quad T_{model} = \overline{T} + \sum_{i=1}^{m-1} \beta_i t_i \quad (1)$$

where $s_i$ and $t_i$ are the eigenvectors of the shape and texture covariance matrix, and $\alpha$ and $\beta$ are the weighting coefficients to be estimated, respectively.

A realistic face shape can be generated by using the equation, $$S^{2D} = fPR\left(\overline{S^{3D}} + \sum_{i=1}^{m-1} \alpha_i s_i^{3D} + t^{3D}\right) + t^{2D} \quad (2)$$

where f is a scale parameter, P is an orthographic projection matrix, and R is a rotation matrix with $\phi$, $\gamma$ and $\theta$ the three rotation angles for the three axes. The $t^{3D}$ and $t^{2D}$ are translation vectors in 3D and 2D, respectively. Given an input face image, the pose parameters f, $\phi$, $\gamma$ and $\theta$ and the shape parameter $\alpha$ can be recovered by minimizing an error between a set of pre-selected feature points in the 3D morphable model and their correspondences $S_f^{img}$ detected in the target image:

$$\arg\min_{f,\phi,\gamma,\theta,t^{2D}} \left\| S(F)^{img} - \left( fPR\left(\overline{S(F)^{3D}} + \sum_{i=1}^{m-1} \alpha_i s_i(F)^{3D} + t^{3D}\right) + t^{2D}\right) \right\|^2 \quad (3)$$

where $\overline{S(F)^{3D}}$ and $s_i(F)^{3D}$ are the shape of the corresponding feature points in the morphable model given in Equation (1).

Initial Shape Estimation

Figure 3:
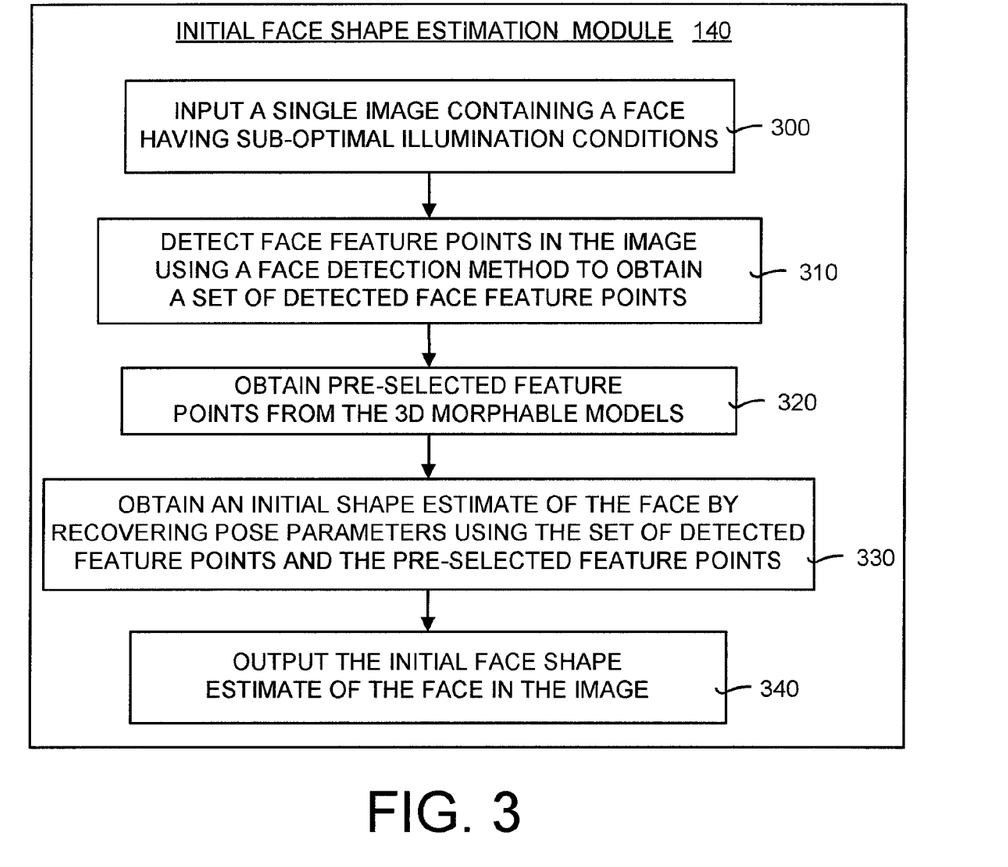
FIG. 3 is a flow diagram illustrating the detailed operation of the initial face shape estimation module shown in FIG. 1.

FIG. 3 is a flow diagram illustrating the detailed operation of the initial face shape estimation module 140 shown in FIG. 1. In general, the module 140 gives a rough pose estimation of the face in the image. The operation begins by inputting a single image containing a face, wherein the image has sub-optimal illumination conditions (box 300). Next, face feature points are detected in the image using a face detection method (box 310). In other words, face feature points $S_f^{img}$ on the input image are detect, which yields a set of detected face feature points. In some embodiments, the face detection method is an automatic face detection method. In other embodiments, the face detection method is one that allows a user to manually selected face feature points in the image.

The module 140 then obtains pre-selected feature points from the 3D morphable models (box 320). Then, based on the set of detected feature points and the corresponding pre-selected feature points in the 3D morphable model, the module 140 obtains an initial shape estimate of the face (box 330). More specifically, the pose parameters f, $\phi$, $\gamma$, and $\theta$ and the shape parameter a is recovered using Equation (3). The module 140 outputs the initial face shape estimate of the face in the image (box 340).

The 3-D morphable model is a notation representing a regulation or constraint. Each face has a morphable model for texture and a 3D morphable model for geometry (or mesh). The geometry is represented by any combination of a set of example images (or meshes). This defines the space of the faces. For example, if 100 faces from real people were scanned, and the resultant image were lined up, a new face is constrained to be any combination of the 100 example faces. In other words, the use of a 3D morphable model constrains the space. The same applies for the 3D morphable model for the texture of the faces.

Image Segmentation

Because the input image was taken under sub-optimal illumination conditions (or harsh lighting conditions), there will be saturated regions in the image. The general goal of this module is to separate out the saturated regions to aid in the decoupling of the image parameters. The image then is divided into a plurality of regions based on pixel classification.

Figure 4:
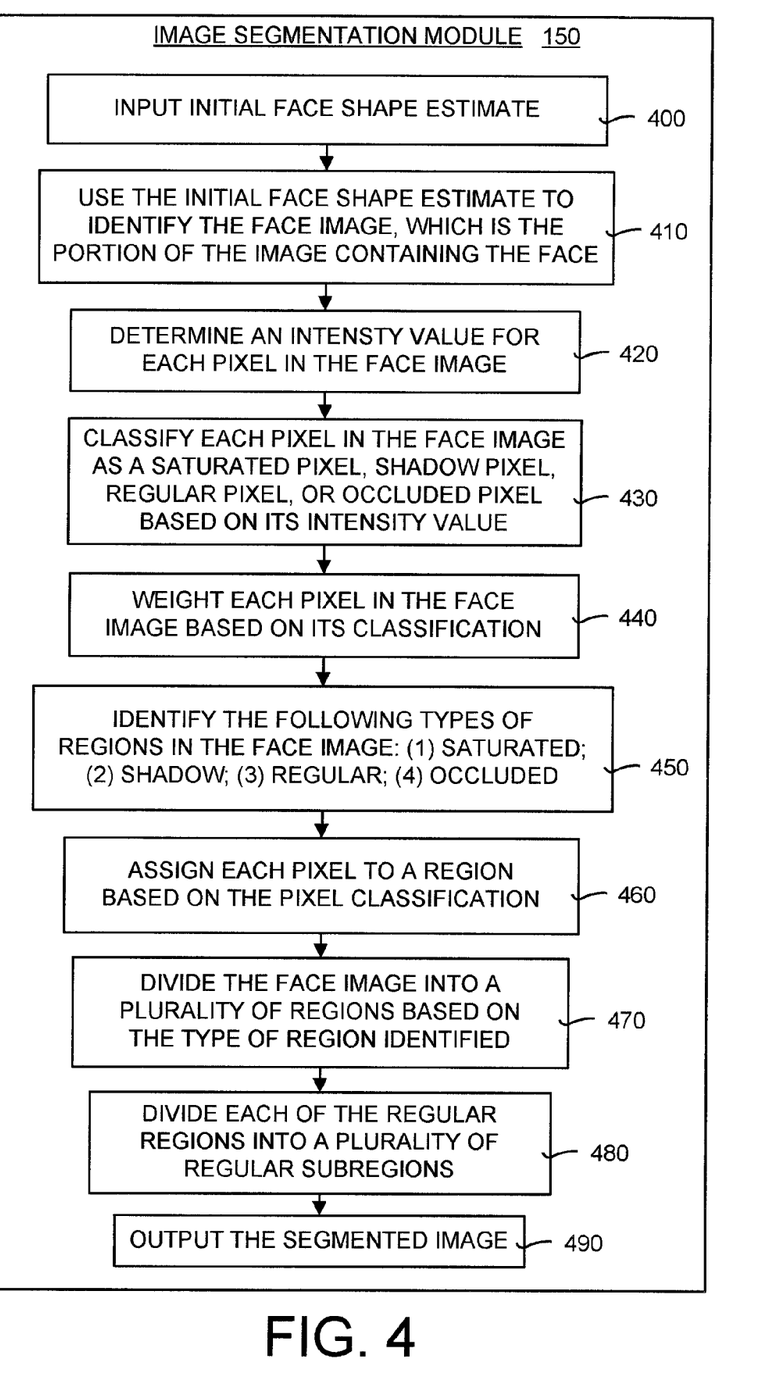
FIG. 4 is a flow diagram illustrating the detailed operation of the image segmentation module shown in FIG. 1.

FIG. 4 is a flow diagram illustrating the detailed operation of the image segmentation module 150 shown in FIG. 1. The operation of the module 150 starts by inputting the initial face shape estimate generated above (box 400). The module 150 uses this initial face shape estimate to identify the face image, which is defined as the portion of the image containing the face (box 410). Next, the module 150 determines an intensity value for each pixel in the face image (box 420). Based on its intensity value, the module 150 classifies each pixel in the face image as either a saturated pixel, shadow pixel (or a pixel in a shadow), regular pixel, or an occluded pixel (box 430).

The module 150 then weights each pixel in the face image based on its classification (box 440). Mathematically, this weight is given by $W_{I_{u,v}}$ which is shown below in Equation (12). The module 150 then identifies the following types of regions in the face image: (a) saturated regions; (b) shadow regions; (c) regular regions; and (d) occluded regions (box 450). The regions are identified by thresholding the intensity values of each pixel. In some embodiments, on a 0-255 grayscale face image, the threshold values were 15 for the cast shadow and 240 for the saturated pixels. Depending on the particular result desired, several others thresholds may be used.

The module 150 assigns each pixel to a region based on its pixel classification (box 460). Next, the module 150 divides the face image into a plurality of the regions described above, based on the pixel assignment and the type of region identified (box 470). Each of the regular regions in the face image then are further divided into a plurality of subregions (box 480). In some embodiments, the size of a subregion is 50×50 pixels. Alternatively, other subregion sizes may be used. The output of the module 150 is a segmented image divided into the different regions (box 490).

Spherical Harmonics Representation

The illumination of the image is represented using spherical harmonics. In general, spherical harmonics are the sphere analog of the Fourier basis on the line or circle, which provide an effective way to describe reflectance and illumination. The appearance of an object can be represented as weighted basis functions by the equation:

$$I(\vec{n}) = \rho(\vec{n})E(\vec{n}) = \rho(\vec{n})\sum_{n=0}^{\infty}\sum_{m=-n}^{n} h_{nm}(\vec{n}) \cdot l_{nm} \qquad (4)$$

where I denotes the image intensity, $\vec{n}$ is the surface normal, $\rho$ is the surface albedo, E is the irradiance, $h_{nm}$ is the spherical harmonic basis, and $l_{nm}$ is the weighting coefficient. The set of images of a convex Lambertian object obtained under a wide variety of lighting conditions can be approximated accurately by a low-dimensional linear subspace using the first 9 spherical harmonic bases. The first 9 spherical harmonic bases are given by the equation:

$$h_1 = \frac{1}{\sqrt{4\pi}}, h_2 = \frac{2\pi}{3}\sqrt{\frac{3}{4\pi}} * n_z, h_3 = \frac{2\pi}{3}\sqrt{\frac{3}{4\pi}} * n_y \qquad (5)$$

$$h_4 = \frac{2\pi}{3}\sqrt{\frac{3}{4\pi}} * n_x, h_5 = \frac{\pi}{4}\frac{1}{2}\sqrt{\frac{5}{4\pi}} * (2n_z^2 - n_x^2 - n_y^2),$$

$$h_6 = \frac{\pi}{4}3\sqrt{\frac{5}{12\pi}} * n_y n_z, h_7 = \frac{\pi}{4}3\sqrt{\frac{5}{12\pi}} * n_x n_z,$$

$$h_8 = \frac{\pi}{4}3\sqrt{\frac{5}{12\pi}} * n_x n_y, h_9 = \frac{\pi}{4}\frac{3}{2}\sqrt{\frac{5}{12\pi}} * (n_x^2 - n_y^2)$$

where $n_x$, $n_y$, $n_z$ denote the x, y, and z components of the surface normal $\vec{n}$. Therefore, any image under general illumination conditions can be approximately represented by a linear combination of the above spherical harmonic illumination bases, which forms a linear equation system given by:

$$I \approx [\rho_1 H_1, \rho_2 H_2, \ldots, \rho_n H_n]^T \cdot l \qquad (6)$$

where $I=[I(\vec{n}_1), I(\vec{n}_2), \ldots, I(\vec{n}_n)]^T$, $H_i=[h_1(\vec{n}_i), h_2(\vec{n}_i)]^T$, $l=[l_1, l_2, \ldots, l_9]^T$, and n is the number of sample points on the face image.

Energy Minimization Framework

Since lighting in smaller image regions is more homogeneous as compared to larger image regions, the subregion-based image parameter recovery system and method subdivides a face into smaller regions to better fit the image under a harsh lighting condition. To overcome problems with current image subdivision techniques, the subregion-based image parameter recovery system and method introduces spatial coherence constraints to the texture (or albedo) model between neighboring regions.

In some embodiments, the subregion-based image parameter recovery system and method divides a face in an image into regular regions having a typical size of 50×50 pixels. For each region, the face texture of the regions is represented by using a Principal Component Analysis (PCA) texture model similar to Equation (1):

$$\rho^q = \overline{T}^q + \sum_{k=1}^{m-1} \beta_k^q t_k^q, q = 1, \ldots, Q \qquad (7)$$

where Q is the total number of regions. Equation (7) represents the morphable model for albedo. The coefficients β are morphable models of neighboring regions. The Q is the region number and q is the region index.

Next, the system and method pose the coherence constraints on the PCA coefficients $\beta_k^q$ between neighboring regions: Given two neighboring regions $q_i$ and $q_j$, for each PCA coefficient $k=1 \ldots, m-1$ the system and method models $\beta_k^{q_i} - \beta_k^{q_j}$ as a random variable of Gaussian distribution with mean 0 and variance $(\sigma_k^{q_i q_j})^2$, and obtains the spatial coherence between the two neighboring regions by maximizing the equation:

$$\Pi_{k=1}^{m-1} Pr(\beta_k^{q_i} - \beta_k^{q_j}), \qquad (8)$$

which is equivalent to minimizing the equation:

$$\sum_{k=1}^{m-1}\left(\frac{\beta_k^{q_i} - \beta_k^{q_j}}{\sigma_k^{q_i q_j}}\right)^2. \qquad (9)$$

Equation (8) represents a smoothing or smoothness constraint between regions. Region q is different from the regions above that are classified as saturated, shadow, and so forth. In some embodiments, if a region is saturated or a shadow it is given less weight. When the face is divided into different regions, these regions may include eyes, nose, and mouth regions. It is desirable for these regions to have different morphable models. All the regions put together comprise the face.

In some embodiments, a similar idea is used for the shape model representation. In particular, a geometry 3D morphable model is generated for each of the plurality of regions. This means that there are texture coefficients for each of the regions. However, since the system and method are not trying to recover detailed geometry, a single shape model is sufficient. Thus, in other embodiments the subregion-based image parameter recovery system models the face geometry using a single 3D morphable model. More specifically, the subregion-based image parameter recovery system and method directly models the surface normal as:

$$\vec{n}^M = \left(\vec{n} + \sum_{i=1}^{m-1}\lambda_i\vec{n}_i\right) / \left\|\vec{n} + \sum_{i=1}^{m-1}\lambda_i\vec{n}_i\right\| \quad (10)$$

where $\lambda$ is the weighting coefficient to be estimated. In light of the discussion above regarding the spherical harmonics representation, the illumination model in Equation (5) can also be added as another constraint to fit the image I:

$$I(\vec{n}) = \rho(\vec{n})\sum_{i=1}^{9}h_i(\vec{n})\cdot l_i \quad (11)$$

Note that for pixels that are saturated or in cast shadows, Equation (11) in general does not hold. Therefore, for each pixel (u,v) the system and method assigns a weight $W_{I_{u,v}}$ to indicate the contribution of the above illumination model. The term, $W_{I_{u,v}}$, is set to a small value if the pixel is in a cast shadow or a saturated area.

Equation (10) is the normal model that goes into Equation (12) and the term $\lambda$ is the weighting coefficients. It should be noted that the term m in Equation (10) may be different from the m in Equation (9). The term m in Equation (9) represents how many components are used. For example, assume that there are 100 samples. From these samples Principal Component Analysis (PCA) components are created. Thus, the m in Equation (9) represents the quantity of components are used in the PCA. On the other hand, the term m in Equation (10) also represent a number of components, but it could be a different number of components than the m in Equation (9). For example, perhaps 10 components are selected for the albedo but 15 components are selected for the shape (or the normal). To be more general, for each region there can be a different m, which can depend on how much the region is changing.

The intensity of points on a face in the image includes the albedo and the illumination or lighting. The illumination part has a low-dimensional property, which can be represented as any combination of the nine basis functions discussed above. The nine basis functions are the harmonic bases (or spherical harmonic bases). Thus, in order to estimate the illumination it is necessary to estimate nine numbers. The subregion-based image parameter recover system and method decomposes the image into the albedo component and the nine illumination coefficients.

The function representing the albedo component is given by $\rho$ in Equation (11), where $\rho(\vec{n})$ is the albedo value of the image at a particular pixel and $\vec{n}$ is the normal pixel, since albedo depends on the orientation of the pixel. The term $$\sum_{i=1}^{p}h_i(\vec{n})\cdot l_i$$

represents the illumination component, where $h_i(\vec{n})$ is the harmonic bases. If $\vec{n}$ is known then the parameters can be found. The term $l_i$ is the weighting coefficients. The term here $\rho(\vec{n})$ changes at each pixel since a face does not have the same albedo or reflectance parameters at each point. However, for an initial albedo estimation, it is assumed that all points on the face have the same albedo. This is the same as estimating the average albedo.

Each of the constraints can be integrated into an energy minimization problem represented by the following equation:

$$\arg\min_{\rho,\lambda,\beta,l}\sum_{q=1}^{Q}\sum_{u,v\in\Omega_q}\left\{W_{l_{u,v}}\left(I_{u,v}-\rho_{u,v}\sum_{i=1}^{9}h_i(\vec{n}_{v,n}^M)l_i\right)^2 + \right.$$
$$\left. W_{MM}(\rho_{u,v}-\rho_{u,v}^q)^2\right\} + W_{SM}N_{sr}\sum_{(i,j)\in N}\sum_{k=1}^{m-1}\left(\frac{\beta_k^i-\beta_k^j}{\sigma_k^{ij}}\right)^2 \quad (12)$$

where $\Omega_q$ denotes the qth region, N={(i,j)|$\Omega_i$ and $\Omega_j$ are neighbors} is the set of all pairs of neighboring regions, $\vec{n}^M$ is constrained by the shape subspace defined in Equation. (10), and $\rho^q$ is constrained by the texture subspace defined in Equation. (7), $W_{MM}$ and $W_{SM}$ are the weighting coefficients of the texture morphable model term and the coherence constraint term, respectively. $N_{sr}$ is the average number of pixels in a region and $(\sigma_k^{ij})^2$ is estimated from the exemplar texture data in the morphable models The objective function in Equation. (12) is an energy function of a Markov Random Field (MRF). The first two terms in Equation (12) are the first order potentials corresponding to the likelihood of the observation data given the model parameters. The third term of equation (12) is the second order potential which models the spatial dependence between neighboring regions. Therefore, the problem that has been formulated is the problem of jointly recovering the shape, texture, and lighting of an input face image as an MRF-based energy minimization (or maximum a posteriori) problem. Furthermore, this framework can be extended to handle different poses by simply replacing the normal constraint in Equation. (10) with the shape constraint in Equation. (3).

Generally the problem specified by Equation (12) is an energy minimization problem. Note that this equation has a great deal of unknowns. This equation is solved is by fixing some variables and solve for the remaining unknowns. Referring to Equation (12), it should be noted that the equation has three parts. The first part of Equation (12) explains the data in the image $I_{u,v}$ such that the albedo modified by the lighting will be as close to I as possible for all the pixels. One term in the first part of Equation (12) is $I_{u,v}-\rho_{u,v}$, where u,v specifies the pixel in the image. The term $I_{u,v}$ is the given image at a pixel. The term $\rho_{u,v}$ is the albedo at the given pixel location in the image. Note that the location u,v is indexed by and replaces the normal $\vec{n}$. The $\Sigma_{i=1}^{9}$ is obtained from Equation (11), where Equation (11) is an estimation. The unknowns in Equation (12) are $I_{u,v}$, $\rho$, $\vec{n}$, and $l_i$. The harmonic bases $h_i$ in Equation (12) are known and are given by Equation (5). Superscript M in Equation (12) is the morphable model for the normal $\vec{n}$. The term $W_{I_{u,v}}$ is the weight for the pixels based on their classification and to which region they belong. For example, if a region is a saturated region, then the weight is low. In some embodiments the weight $W_{I_{u,v}}$ varies from 0 to 1. The term $\Sigma_{q=1}^{Q}$ is an index of regions.

The second part of Equation (12) describes how the morphable model for each region is defined. In particular, the term $W_{MM}$ is a weight for a morphable model, and the term $\rho_{u,v}$ is the albedo, which is unknown. The term $\rho_{u,v}^q$ is $\rho_{u,v}$ constrained by the morphable model.

The third part of Equation (12) is a smoothness constraint between the regions. Recall that the face in the image has been divided into many smaller regions. In equation (12), the first two parts are the constraints for each of the regions while the third part is the correlation for the regions. This avoids issues at the boundaries of any two regions and avoid inconsistencies. Thus, in order to properly join and correlate the regions the third part of Equation (12) is the smoothing constraint. This third part of is discussed further in the "Region Joining" section below.

In some embodiments of the subregion-based image parameter recovery system and method, simple thresholding is used to determine whether a pixel is in a cast shadow or saturated region. In some embodiments, a 0-255 gray-scale face Image is used and the threshold values are 15 for the cast shadows and 240 for the saturated pixels. Moreover, in some embodiments $W_{I_{u,v}}$ set to 0 for pixels in the shadow and saturated areas and 1 for the pixels in other regular areas. In other embodiments $W_{MM}$=4 and $W_{SM}$=500 for all regions. In some embodiments, because a typical size of a regular region is 50×50 pixels, the average pixel number $N_{sr}$ is 2500. Due to the nonlinearity of the objective function in equation (12), the overall optimization problem is solved in an iterative fashion. In other words, the albedo $\rho$ and the surface normal $\vec{n}$ are fixed and the system and method solves for the lighting I. Once the lighting is knows, the lighting I is fixed and the system and method solve for the albedo $\rho$ and the surface normal $\vec{n}$.

However, the linear equation system of equation (6) is under-constrained because the surface albedo $\rho$ varies from point to point. Therefore, it is impossible to obtain the initial lighting $l_{init}$ without any knowledge of the surface albedo $\rho$. As is known in the art, however, the albedo of a human face, although not constant, lacks low-frequency components other than the constant component. Using this knowledge, then the system and method can expand $\rho(\vec{n})$ by using spherical harmonics as:

$$\rho(\vec{n}) = \rho_{00} + \Psi(\vec{n}) \quad (13)$$

where $\rho_{00}$ is the constant component and $\Psi(\vec{n})$ contains other higher order components. This means that Equation (4) can be further simplified to obtain the equation:

$$\rho(\vec{n})E(\vec{n}) \approx \rho_{00} \sum_{n=0}^{2} \sum_{m=-n}^{n} h_{nm}(\vec{n}) \cdot l_{nm} \quad (14)$$

Consequently, the original under-constrained problem of equation (6) can be approximated by the following system of linear equations:

$$I \approx \rho_{00}[H_1, H_2, \ldots, H_n]^T \cdot l \quad (15)$$

Given an image of a face with known surface normal $\vec{n}$, the subregion-based image parameter recovery system and method can solve for the initial values of the 9 spherical harmonic coefficients $I=[I_1, I_2, \ldots, I_9]^T$ using a least squares procedure, up to a constant albedo $\rho_{00}$.

As stated above, the initial albedo estimation represented the average albedo across the face. This initial estimation is improved upon by using Equation (13). Equation (13) includes the average albedo $\rho_{00}$. The second part of Equation (13) is the high-frequency information, or the higher-order components of the albedo. After the improvement of the initial estimations, then Equation (8) becomes Equation (9), and Equation (11) can be rewritten as Equation (15).

Initial Parameter Estimation

Figure 5:
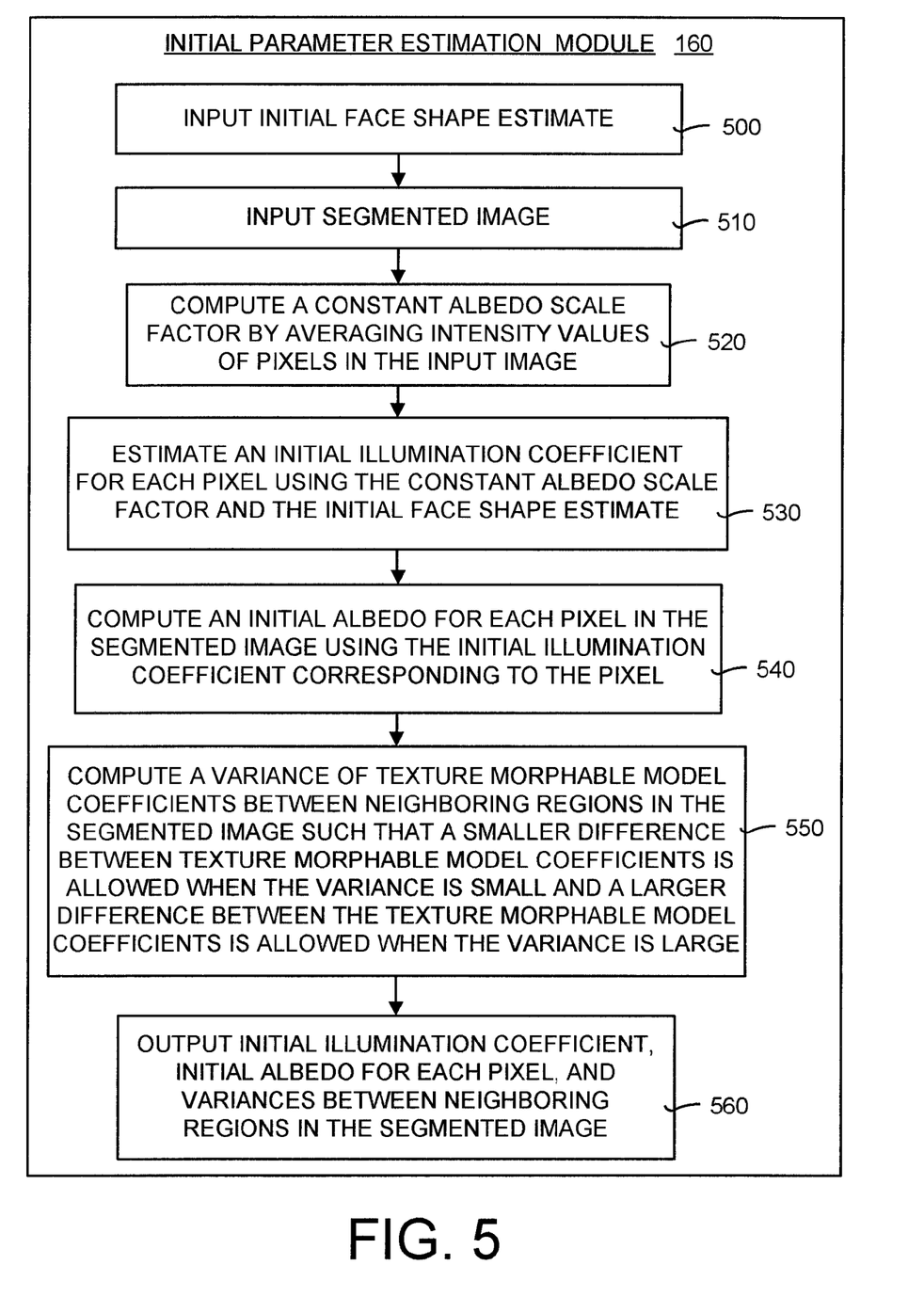
FIG. 5 is a flow diagram illustrating the detailed operation of the initial parameter estimation module shown in FIG. 1.

FIG. 5 is a flow diagram illustrating the detailed operation of the initial parameter estimation module 160 shown in FIG. 1. The module 160 inputs the initial face shape estimate (box 500) and the segmented image (box 510). Next, the module 160 computes a constant albedo scale factor $\rho_{oo}$ by averaging the intensity values of the input face image (box 520). The module 160 then estimates an initial illumination coefficient $I_{init}$ for each pixel using the constant albedo scale factor $\rho_{00}$ and the initial face shape estimate (box 530). This estimate is computed using Equation (15).

An initial albedo $\rho_{init}$ is computed for each pixel in the segmented image using the initial illumination coefficient $I_{init}$ corresponding to the pixel (box 540). This estimate is computed using Equation (11). The module 160 then computes a variance of the texture (or albedo) morphable model coefficients between neighboring regions in the segmented image (box 550). A smaller difference between texture morphable model coefficients is allowed when the variance is small, while a larger difference between the texture morphable model coefficients is allowed when the variance is large. In other words, the difference between the two sets of morphable model coefficients is proportional to the variance.

Having the texture morphable model coefficients relatively close to each other allows the neighboring regions to be joined. The morphable model coefficients are shown as $\beta_k^i$ and $\beta_k^j$ in Equation (12). Note that $\beta_k^i$ is subtracted from $\beta_k^j$ in order to find the difference between them. The indices i and j are indexes for different regions, and the k is the index of the morphable model coefficients. This part of Equation (12) states that if the two regions are adjacent to each other, then their corresponding morphable model coefficients should not be too far from each other. The term $\sigma_k^{i,j}$ is the variance or deviation. As stated above, if $\sigma_k^{i,j}$ is large, then a bigger change is allowed in the neighboring regions. On the other hand, if $\sigma_k^{i,j}$ is small, then a much smaller change is allowed between neighboring regions. The term $\sigma_k^{i,j}$ can also be thought of as an inverse weighting. By way of example, consider an eyebrow on a face. There is a large difference between an eyebrow and neighboring regions of the face. Therefore, the variance should be large. The module 160 then outputs the initial illumination coefficient $I_{init}$, the initial albedo $\rho_{init}$ for each pixel, and the variance (box 560).

Iterative Minimization

FIG. 6 is a flow diagram illustrating the detailed operation of the image parameter computation module 170 shown in FIG. 1. The module 170 constructs an objective function that is an energy minimization problem containing the illumination parameters, albedo, texture PCA coefficients, shape PCA coefficients, a surface normal, and variances between neighboring regions in the segmented image (box 600). This objective function is represented by Equation (12) above.

Equation (12) then is solved to find the illumination, albedo, and face shape. Solving Equation (12) is done iteratively, and shown by the arrow going from box 620 back to box 610. First, the illumination parameters $I_i$, the albedos $\rho_{u,v}$, and the morphable model coefficients $\beta_k^j$ and $\beta_k^j$ (the texture PCA coefficients and shape PCA coefficients), and the surface normal $\vec{n}$ are fixed (box 610). Next, the module 170 fixes the albedo and the surface normal and solves the objective function for the illumination parameter using an energy minimization technique (box 620). This technique fixes one set of the parameters in order to solve for the rest of the parameters. The parameters are cycled through in an iterative fashion to find each of the parameters. In a working example of the system and method, only 2 iterations were needed to generate photo-realistic results.

Once Equation (12) is fully solved, the lighting, albedo, and face shape are known. The output of the module 170 is the recovered and decoupled image parameters (box 630). These image parameters include the albedo, illumination parameter, and surface normal. The system and method output these image parameters for use by an application.

III. Exemplary Operating Environment

The subregion-based image parameter recovery system and method is designed to operate in a computing environment. The following discussion is intended to provide a brief, general description of a suitable computing environment in which the subregion-based image parameter recovery system and method may be implemented.

Figure 7:
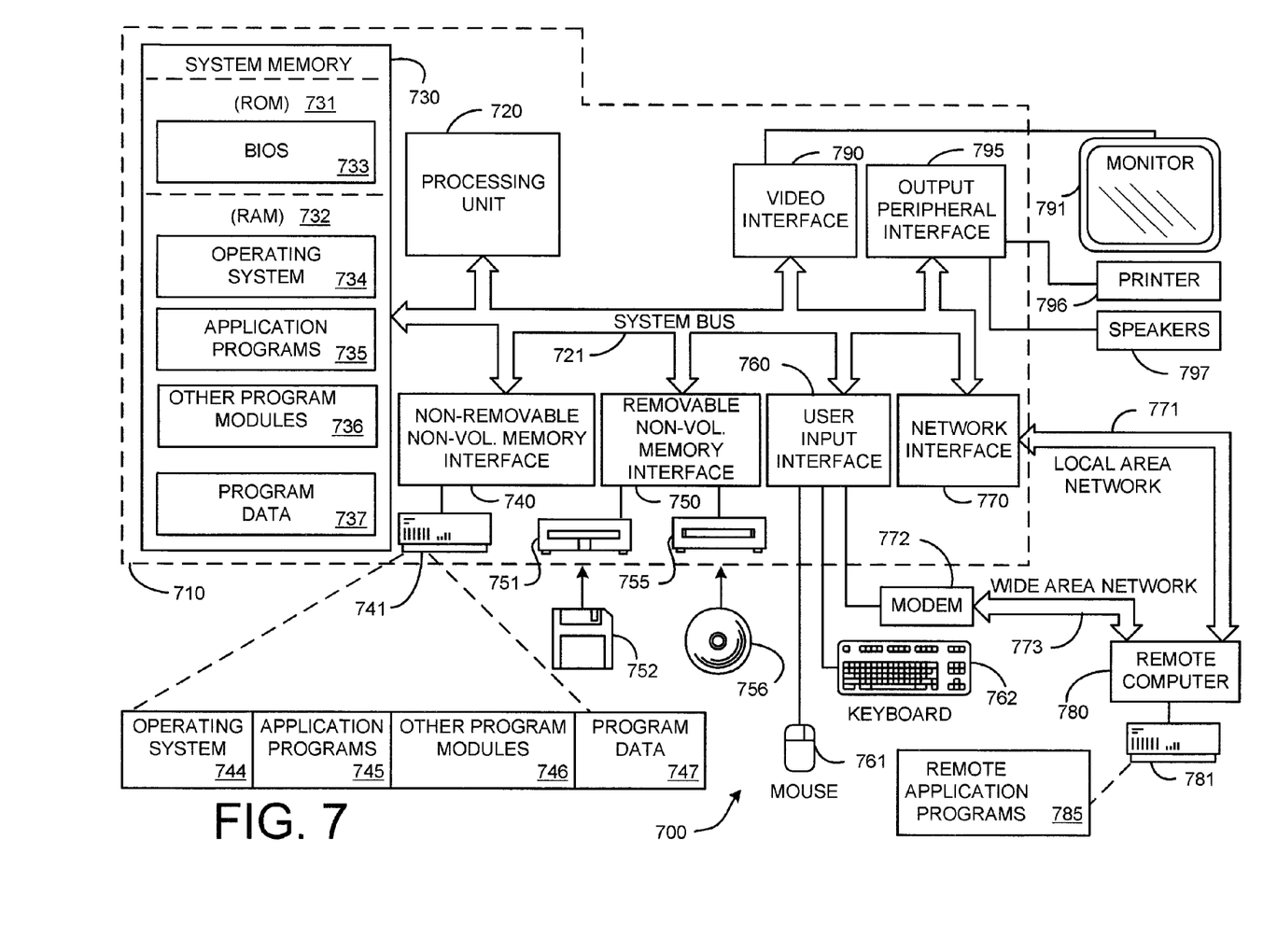
FIG. 7 illustrates an example of a suitable computing system environment in which the subregion-based image parameter recovery system and method shown in FIGS. 1-6 may be implemented.

FIG. 7 illustrates an example of a suitable computing system environment in which the subregion-based image parameter recovery system and method shown in FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment.

The subregion-based image parameter recovery system and method is operational with numerous other general purpose or special purpose computing system environments or configurations. Examples of well known computing systems, environments, and/or configurations that may be suitable for use with the subregion-based image parameter recovery system and method include, but are not limited to, personal computers, server computers, hand-held (including smart-phones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The subregion-based image parameter recovery system and method may be described in the general context of computer-executable instructions, such as program modules, being executed by a computer. Generally, program modules include routines, programs, objects, components, data structures, etc., that perform particular tasks or implement particular abstract data types. The subregion-based image parameter recovery system and method may also be practiced in distributed computing environments where tasks are performed by remote processing devices that are linked through a communications network. In a distributed computing environment, program modules may be located in both local and remote computer storage media including memory storage devices. With reference to FIG. 7, an exemplary system for the subregion-based image parameter recovery system and method includes a general-purpose computing device in the form of a computer 710 (the personal computing device 110 is an example of the computer 710).

Components of the computer 710 may include, but are not limited to, a processing unit 720 (such as a central processing unit, CPU), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer readable media. Computer readable media can be any available media that can be accessed by the computer 710 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 710. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 740 includes computer storage media in the form of volatile and/or nonvolatile memory such as read only memory (ROM) 731 and random access memory (RAM) 732. A basic input/output system 733 (BIOS), containing the basic routines that help to transfer information between elements within the computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information (or data) into the computer 710 through input devices such as a keyboard 762, pointing device 761, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 720 through a user input interface 760 that is coupled to the system bus 721, but may be connected by other interface and bus structures, such as, for example, a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for processing an image containing a face, comprising:
   using a computing device to perform the following:
   dividing a portion of the image containing the face into a plurality of regions;
   generating an albedo morphable model for each of the plurality of regions;
   using smoothness constraints to model spatial dependence between neighboring ones of the plurality of regions; and
   recovering image parameters associated with the image using each of the albedo morphable models.

2. The method of claim 1, wherein the recovered image parameters include at least one of: (a) an albedo of the portion of the image containing the face; (b) a surface normal of the portion of the image containing the face; (c) an illumination parameter of the portion of the image containing the face.

3. The method of claim 1, further comprising:
   detecting face feature points in the image using a face feature detection method to obtain a set of detected feature points;
   obtaining pre-selected feature points from the 3D morphable models; and
   recovering pose parameters and shape parameters using the set of detected feature points and the pre-selected feature points to estimate an initial shape of the face.

4. The method of claim 3, further comprising using the initial shape estimate of the face to divide the portion of the image containing the face into a plurality of regions.

5. The method of claim 4, wherein dividing the portion of the image containing the face into a plurality of regions further comprises:
   identifying a following type of regions in the image: (a) a saturated region; (b) a shadow region; (c) a regular region; (d) an occluded region; and
   dividing the image into the plurality of regions based on the type of region identified.

6. The method of claim 5, further comprising dividing each of the regular regions into a plurality of regular subregions.

7. The method of claim 5, further comprising:
   compute a constant albedo scale factor by averaging intensity values of the image; and
   estimating an initial illumination coefficient using the constant albedo scale factor and the initial shape estimate of the face.

8. The method of claim 7, further comprising computing an initial albedo at each pixel in the portion of the image containing the face.

9. The method of claim 8, further comprising constructing an objective function that is an energy minimization problem containing the illumination parameter, the albedo, texture Principal Component Analysis (PCA) coefficients, shape PCA coefficients, and a surface normal.

10. The method of claim 9, further comprising:
    fixing the illumination parameter and solving for the albedo, the texture PCA coefficients, the shape PCA coefficients, and the surface normal; and fixing the albedo and the surface normal and solving for the illumination parameter.

11. A computer-readable storage medium having computer-executable instructions stored thereon for changing an illumination condition of an image containing a face, comprising:
inputting the image that was taken under harsh lighting conditions and identifying a portion of the image containing the face as a face image;
segmenting the face image into a plurality of regions;
generating an albedo morphable model for each of the plurality of regions;
holding an illumination constant and solving for albedo and geometry in an iterative manner;
generating a geometry morphable model for each of the plurality of regions such that the geometry morphable model and the albedo morphable model are two separate morphable models; and
holding the albedo and geometry constant and solving for illumination in an iterative manner.

12. The computer-readable storage medium of claim 11, further comprising determining that a first set of morphable model coefficients for a first region are within a variance from a second set of morphable model coefficients for a second region that is neighboring region of the first region.

13. The computer-readable storage medium of claim 12, further comprising computing the variance using exemplar texture data in the albedo morphable models of the first region and the second region.

14. The computer-readable storage medium of claim 13, further comprising allowing a smaller difference between values of the first set of morphable model coefficients and the second set of morphable model coefficients when the variance is small and allowing a larger difference between the values if the variance is large.

15. The computer-readable storage medium of claim 14, wherein segmenting the face image into a plurality of regions further comprises identifying saturated regions, shadow regions, regular regions, and occluded regions in the face image.

16. A computer-implemented process for improving an illumination of a single image containing a face and taken under sub-optimal illumination conditions, comprising:
computing an initial shape estimation of the face to generate a face image, wherein the face image is the portion of the image containing the face;
classifying each pixel in the face image as one of: (a) a saturated pixel; (b) a shadow pixel; (c) a regular pixel; (d) an occluded pixel;
weighting each pixel in the face image based on its classification;
assigning each pixel to one of a plurality of regions in the face image based on the pixel classification;
generating using the computer an albedo morphable model for each of the plurality of regions;
generating using the computer a geometry morphable model for each of the plurality of regions such that the geometry morphable model and the albedo morphable model are two separate morphable models; and
obtaining image parameters from the morphable models that are used to improve the illumination of the single image containing the face.

17. The computer-implemented process of claim 16, wherein classifying each pixel in the face image further comprises:
determining an intensity value for each pixel; and
classifying each pixel based on its intensity value.

18. The computer-implemented process of claim 17, further comprising modeling spatial dependence between neighboring regions of the plurality of regions using smoothness constraints.

19. The computer-implemented process of claim 18, further comprising:
computing an albedo scale factor by averaging intensity values for the face image;
estimating an initial illumination coefficient at each pixel based on the albedo scale factor; and
computing an initial albedo at each pixel using the corresponding initial illumination coefficient for that pixel.

20. The computer-implemented process of claim 19, further comprising:
using an iterative minimization technique to obtain the image parameters that include an albedo and an illumination coefficient; and
changing the illumination coefficient to improve illumination of the image while changing the albedo to preserve a quality of the image.

* * * * *